United States Patent
Hurst et al.

[11] 3,779,096
[45] Dec. 18, 1973

[54] SHIFT CONTROL ASSEMBLY

[75] Inventors: George H. Hurst, Huntington Beach, Calif.; Emanuel F. Cambria, Philadelphia, Pa.

[73] Assignee: Hurst Performance, Inc., Warminster, Pa.

[22] Filed: May 22, 1972

[21] Appl. No.: 255,397

[52] U.S. Cl. .................................................. 74/476
[51] Int. Cl. ............................ G05g 9/16, G05g 5/02
[58] Field of Search ................. 74/476, 473 R, 475, 74/477

[56] References Cited
UNITED STATES PATENTS

| | | | |
|---|---|---|---|
| 2,961,890 | 11/1960 | Marshall | 74/477 |
| 3,018,670 | 1/1962 | Lohn | 74/473 R |
| 3,636,793 | 1/1972 | Bieber | 74/476 R |

Primary Examiner—Allan D. Herrmann
Attorney—James F. Coffee et al.

[57] ABSTRACT

A shift control for use with an automobile manual transmission characterized by the provision of a shift control lever connected to a horizontally disposed follower pin which tracks in generally horizontal disposed and vertically offset slots of a pair of selector arms, one slot having an upwardly extending vertical notch and the other slot having a downwardly extending vertical notch, the upper slot being in horizontal alignment with the notch in the lower slot and the lower slot being in horizontal alignment with the notch in the upper slot. The follower pin is normally biased downwardly and the surfaces of the slots and notches are such as to urge the pin from the upper slot and the upper notch of the lower slot, into the lower notch of the upper slot and the lower slot, when the pin is moved from the leading edge of the upper slot towards the trailing edge thereof. By this arrangement, the gears of the transmission may be shifted through different speeds by moving the lever in a planar path of travel.

Also a separate reverse gear control is provided which is operable only when the system is in a neutral mode.

28 Claims, 12 Drawing Figures

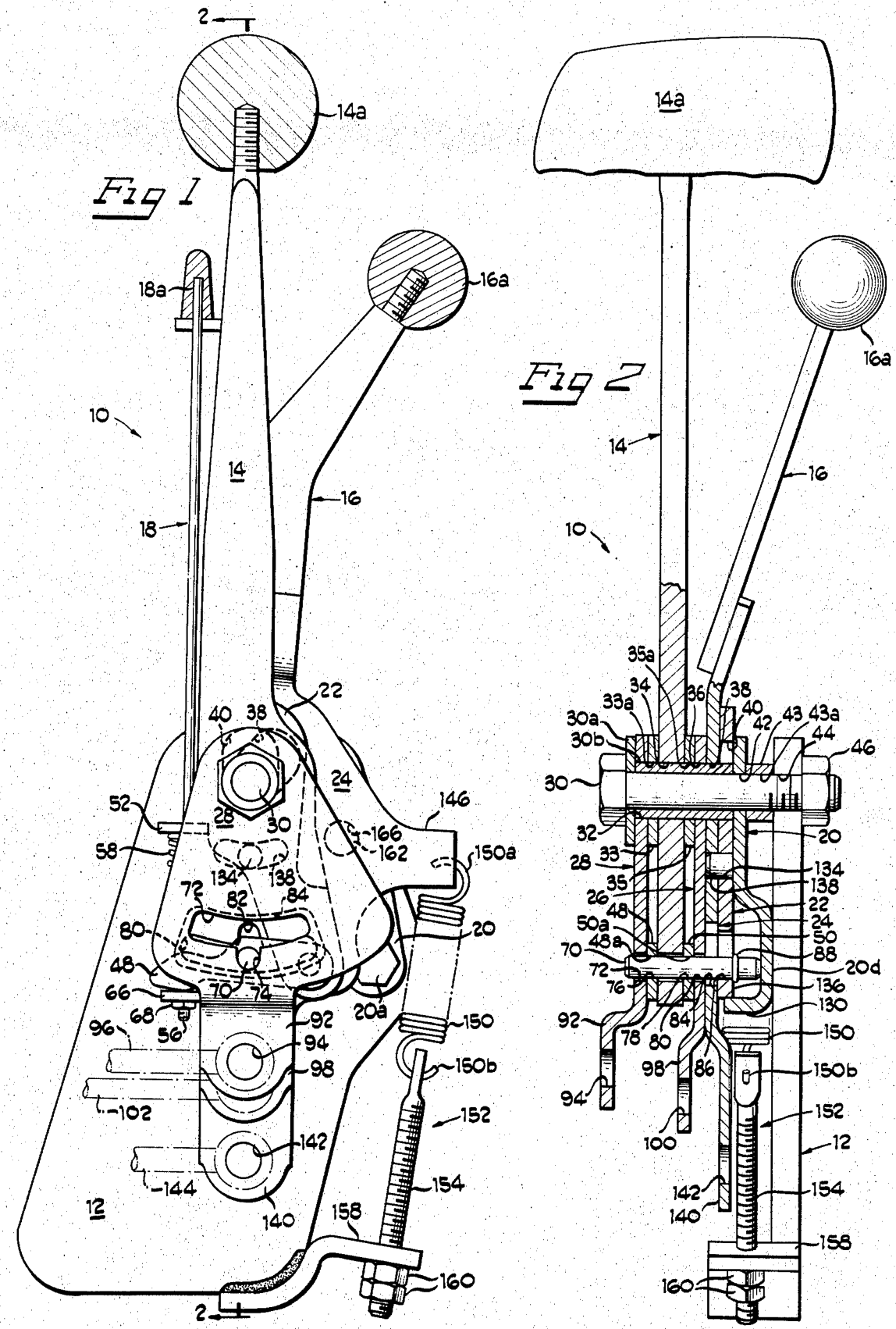

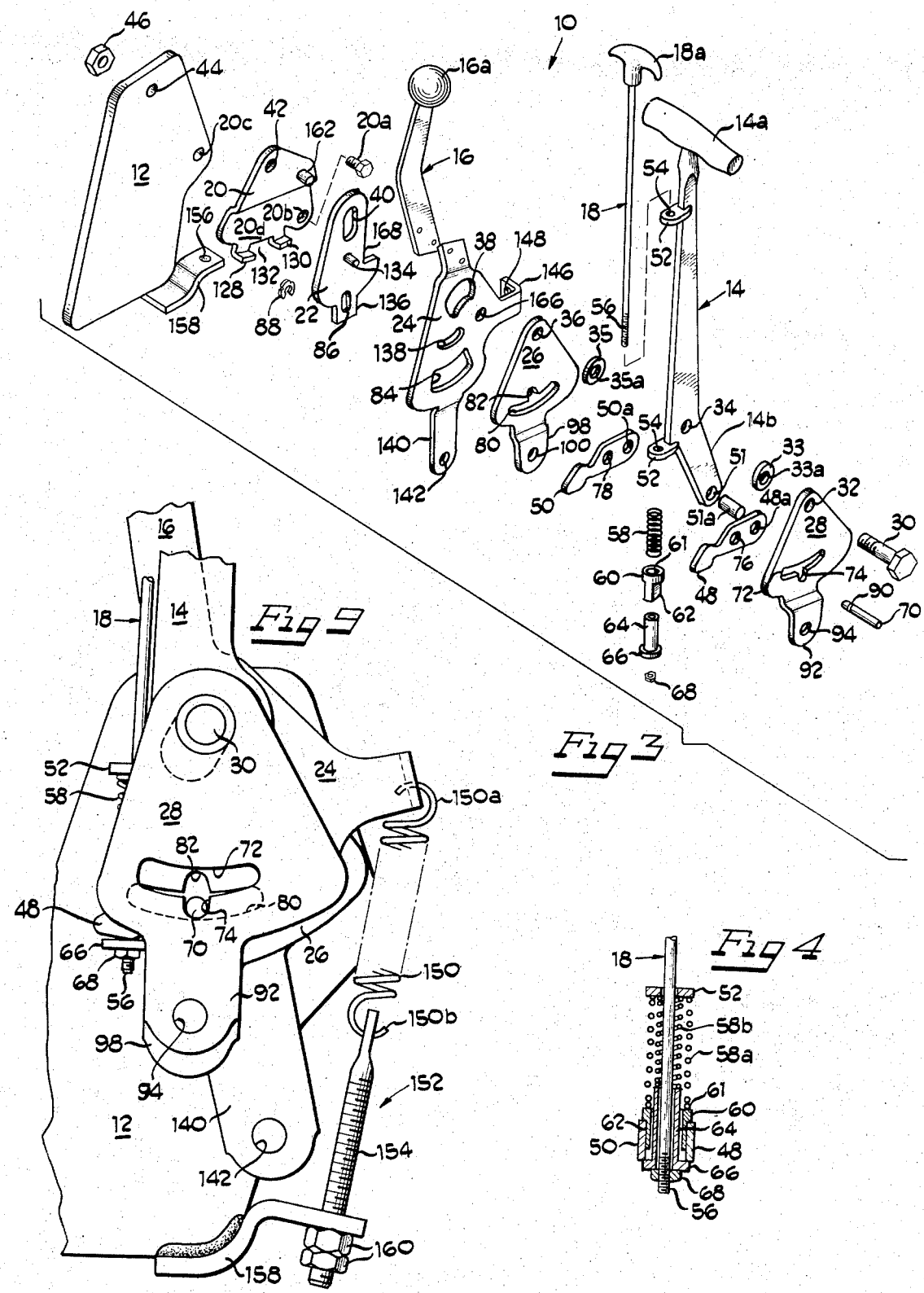

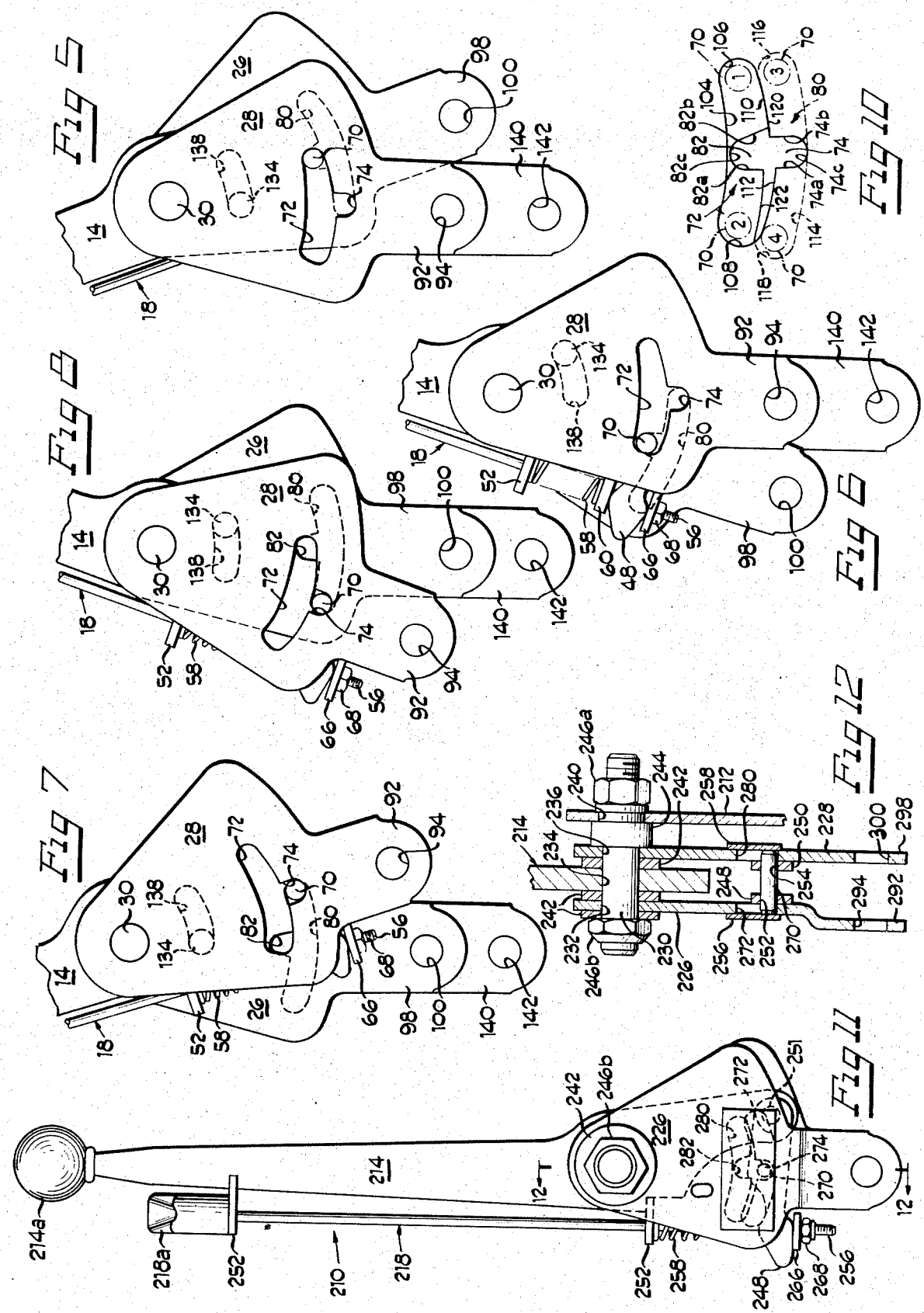

SHIFT CONTROL ASSEMBLY

BACKGROUND OF THE INVENTION

1. Field of the Invention

This invention relates to automobile transmission shift controls.

2. Brief Description of the Prior Art

In recent years there have been many improvements in automobile transmission, of both the automatic and manual type, including improvements which facilitate faster shifting through the different speeds or gears of the transmission. In competitive or racing type vehicles, these improvements are especially welcome in that they reduce or essentially eliminate lost segments of time as the transmission changes speeds or gears.

In manual transmission, heretofore it has been common in either three or four speed transmissions for the shift pattern to be in the form of a well known H pattern. This results in a slight time loss as the gear lever or selector must be moved across the H from one plane thereof to another.

It is the object of this invention to meet the continuing need and desire in the art for improvements in transmissions, and particularly those for use in sports or racing type cars, by providing a multiple speed manual transmission shift control wherein the control lever is shifted in one plane through all four speeds of the transmission. Also, it is the object of this invention to provide, in a transmission control of this type, an improved positive lockup for the reverse mode gear selector.

SUMMARY OF THE INVENTION

This invention is directed, in brief, to the provision of an improved manual transmission shift control wherein shifting through the different gear ratios may be accomplished by moving the shift lever in a generally planar path of travel. Also, the invention is directed to providing, in such a control, a means for locking a separate reverse control lever against operation in any mode but the neutral mode of the shift control apparatus.

The best mode currently contemplated for carrying out the invention includes a main supporting plate to which a main pivot bolt is connected. Mounted on the main pivot bolt are a first and second gear selector plate; a third and fourth gear selector plate; a shift control lever between the gear plates; a reverse gear arm and lever; a movable reverse gear locking plate; and a fixed reverse gear locking plate.

The gear selector plates have arcuate, generally horizontally disposed and vertically offset slots, each with a vertical notch, one extending upwardly from the lower slot and the other extending downwardly from the upper slot. The shift lever carries biased pivoted gate arms and a shift follower pin extends through the arms and the slots of the selector plate. A spring loaded shift rod is connected to the pivoted gate arms for pulling the gate arms and the follower pin upwardly against the normal downward bias thereof.

To place the system in first gear, the shift rod is raised to move the pin into the upwardly extending notch of the lower slot and into the upper slot of the third and fourth gear plate so that the shift lever may be moved forwardly causing the pin to move towards the trailing edge of the upper slot such that the first and second gear plate is moved by the pin. To shift into second gear, the shift lever is merely moved rearwards causing the pin to traverse to the leading edge of the upper slot. To shift into third, the shift lever is again pushed forwardly but as the downwardly extending notch of the upper slot aligns with the pin, the pin drops into this notch and the lower slot of the first and second gear plate, so that the pin may move toward the trailing edge of the lower slot and move the third and fourth gear plate. Finally, to shift into fourth gear the shift lever is merely moved to rear, moving the third and fourth gear plate and moving the pin toward the leading edge of the lower slot.

The shift pin also extends through the reverse gear arm and movable locking plate. The movable locking plate has a depending tongue of a size and shape to extend between two laterally projecting lugs of the fixed locking plate. The tongue is aligned with a space between the lugs when the system is in a neutral mode. The movable locking plate also has a laterally projecting stub which extends into a cam slot in the reverse selector arm. The reverse selector arm is associated with spring means for normally urging the arm downwardly. When the system is in neutral the movable locking plate tongue can move through the lugs of a fixed locking plate responsive to downward urging of the reverse selector arm, permitting pivotal movement of the reverse selector arm and an associated movement with the linkage connected thereto and with a transmission.

BRIEF DESCRIPTION OF THE DRAWINGS

FIG. 1 is a side elevational view of one form of the shift control device of this invention preferably for use with a four forward speed transmission, and showing the device in a neutral mode;

FIG. 2 is a partial sectional view with the section being taken generally along the line 2—2 of FIG. 1;

FIG. 3 is an exploded view of the shift control device shown in FIG. 1;

FIG. 4 is a fragmentary sectional view of the biasing means for the movable gate arms;

FIG. 5 is a fragmentary side elevational view of the shift control device shown in a first gear mode;

FIG. 6 is a fragmentary side elevational view of the shift control device in a second gear mode;

FIG. 7 is a fragmentary side elevational view of the shift control device in a third gear mode;

FIG. 8 is a fragmentary side elevational view of the shift control device in a fourth gear mode;

FIG. 9 is a fragmentary side elevational view of the shift control device in a reverse mode;

FIG. 10 is a diagrammatic view of the follower pin in different positions of the two slots of the gear selector arms in the different gear modes represented therein;

FIG. 11 is a side elevational view of another form of the shift control of this device for use with a three-speed transmission; and FIG. 12 is a fragmentary section view taken generally along the line 12—12 of FIG. 11.

While this invention is susceptible of embodiment in many different forms, there is shown in the drawings and will herein be described in detail different embodiments therefor, with the understanding that the present disclosure is to be considered as an exemplification of the principles of the invention and is not intended to limit the invention to the embodiments illustrated.

BRIEF DESCRIPTION OF THE PREFERRED EMBODIMENTS

The shift control assembly 10 of this invention is intended for use with a multiple speed manual automobile transmission for competitive sports type or racing cars or pleasure type sports cars. The preferred embodiment 10 is intended for use with a four forward speed manual transmission. The components to be described herein are preferably made of a suitable rigid durable material such as steel or similarly acceptable metallic elements.

General Components of the Assembly

The shift control assembly 10 includes a base mounting plate or frame plate 12 to which the several components are associated. The control levers for the shift control assembly 10 includes a generally upright forward speed shift control lever 14 having a transverse handle 14a at the top thereof and a rearwardly angled lower end 14b; a generally upright reverse lever 16 having a knob 16a at the top thereof; and a shift rod 18 which is spring loaded as will be explained, having a T-handle 18a at the upper end thereof.

The shift control assembly includes a fixed reverse locking plate 20 which is fixed to the plate 12 by means of a bolt 20a that extends through an opening 20b in the plate 20 and is captivated in an aperture 20c in plate 12. Fixed reverse locking plate 20 has an offset lower portion 20d which generally abuts the plate 12 as will be explained.

Further, included in the components of the shift assembly 10 is a movable reverse locking plate 22 which is located between the fixed locking plate 20 and a reverse plate 24 to which the reverse lever 16 is connected. Next in sequence within the assembly is a first and second gear plate 26 which is on one side of the shift control lever 14 and a third and fourth gear plate 28 which is on the other side of the control lever 14.

A master pivot bolt 30 mounts all of the aforesaid components with respect to the base mounting plate 12. In particular, bolt 30 is surrounded by an outer washer 30a and a sleeve 30b and extends through an aperture 32 in plate 28, aperture 34 in lever 14 and aperture 33a of spacer washer 33. Progressing further, the bolt 30 extends also through aperture 36 in plate 26, aperture 35a of spacer washer 35, arcuate cam slot 38 in plate 24, vertically enlarged opening 40 in plate 22 and aperture 42 in fixed locking plate 20. Another spacer 43, having an aperture 43a, extends between the plate 20 and the base plate 12 behind the aperture 42. Finally, bolt 30 extends through opening 44 in base plate 12, and to the rear of base plate 12 a nut 46 is secured to the threaded end of bolt 30 thereby mounting all of the plates 20 through 28 and the lever 14 about the bolt with respect to the base plate 12.

Forward Speed Control System

A pair of gate fingers 48 and 50 are disposed on either side of the lever 14 and, particularly the angled lower end 14b thereof. Each finger 48 and 50 has an opening 48a and 50a therein aligned with opening 51 at the bottom of end 14b for receiving a pin 51a to pivotally mount the fingers 48 and 50 with respect to the lever 14. Lever 14 is further provided with forward extensions 52 having apertures 54 therein for receiving shift rod 18. The threaded end 56 of shift rod 18 extends below the lowermost extension 52 and springs 58a and 58b are disposed about the lower end of rod 18 below the lowermost extension 52. A spacer 60 having an enlarged flanged upper end 61 abuts the lower end of spring 58a and is provided with flat sides 62 so as to be snugly received between the fingers 48 and 50. In addition, a sleeve 64 extends outwardly through spacer 60 and abuts the bottom of spring 58b. Sleeve 64 is provided with an enlarged flanged lower end 66 which underlies the fingers 48 and 50. A nut 68 is threaded to the lower threaded end 56 of rod 18 below end 66 of sleeve 64 so as to secure the rod and fingers together as a spring urged system which is pivoted about pin 51a and its connection with apertures 48a, 51 and 50a.

The shift control assembly 10 of this invention further includes a follower pin 70. Follower pin 70 tracks in a generally crescent shaped arcuate horizontal slot 72 in plate 28, extends through openings 76 and 78 in movable gate fingers 48 and 50 and tracks in another generally crescent shaped arcuate horizontal slot 80 in plate 26. Slot 72 has a downwardly extending notch 74 in the lower edge of the slot and which includes generally upright sides 74a and 74b and a rounded bottom 74c. Slot 80 includes an upwardly extending notch 82 in the upper edge of the slot and which includes upright side 82a, canted or inclined side 82b, and a rounded top 82c. Preferably, the slots are formed in the plates 26 and 28 so that they are, for the most part, vertically spaced or offset relative to each other with the notch 82 in horizontal alignment with the slot 72 and the notch 74 in horizontal alignment with the slot 80. The pin 70 further extends through the vertically and laterally enlarged arcuate slot 84 in reverse plate 24, and elongated opening 86 in plate 22. The terminal end of the pin 70 abuts the lower off-set portion 20d of the plate 20 and a lock ring 88 is received in an annular groove 90 to the rear of the plate 22 to hold the pin 70 against withdrawal from the aforementioned openings and slots through which the pin 70 is inserted.

Plate 28 is provided with a depending tongue 92 having an opening 94 therein for connection with a link rod 96 which may extend to and be connected with the transmission. Similarly, plate 26 also has a depending tongue 98 with an opening 100 therein through which a link rod 102 may be connected which may also extend to the transmission. As will be explained, plate 28 comprise a third and fourth gear plate and plate 26 comprise a first and second gear plate. The notch 82 in plate 26, and the slot 72 in plate 28, comprises a first and second gear notch and slot, and the notch 74 in the plate 28 and slot 80 in plate 26 comprise a third and fourth gear notch and slot. That is to say, when the pin 70 is occupying the notch 82 and traveling in the slot 72, it will cause movement of the first and second gear plate and associated rod responsive to movement of the lever 14; whereas when the pin 70 occupies the slot 80 and notch 74 it will cause actuation of the third and fourth gear plate and associated rod responsive to movement of the lever 14.

As best seen in FIG. 10, the slot 72 has an arcuate top edge 104 terminating in rounded ends 106 and 108. End 106 is at the trailing end of slot 72 and end 108 is at the leading end of slot 72. The slot 72 is further defined by bottom edge 110 which extends from rounded trailing end 106 to notch 74, and in particular, to the juncture with the side wall 74b. At the juncture with the side wall 74a of the notch 74, the slot 72 is further defined by the bottom portion 112 which extends to the rounded leading end 108. Bottom portion 112 is slightly lower than portion 110 so that the notch is relatively widened toward the leading edge or, in other words so that the trailing bottom edge is raised relative to the leading bottom edge.

Similarly, the slot 80 is defined by an arcuate bottom edge 114 which terminates at the rounded trailing end 116 and rounded leading end 118. The top of slot 80 is further defined by an edge 120 which extends from trailing end 116 to the intersection with inclined edge 82b of notch 82. This top edge is intended to be generally coincident with bottom edge portion 110 of the notch 72. The top edge of slot 72 continues from edge 82a of notch 82 and is defined by surface 122 which extends to the rounded leading end 118. Top edge 122 of slot 80 is slightly above bottom edge 112 of slot 72 so that there is some overlap in this area. In other words, when the pin 70 is occupying the notch 82 it may also partially occupy slot 72.

In operation, to place the shift control assembly 10 in the first gear mode, from the neutral mode as shown in FIG. 1, the rod 18 is pulled on the handle 18a to raise the fingers 48 and 50 which hold the follower pin 70, against the biasing force of springs 58a and 58b. This moves follower pin 70 upwardly into notch 82 and slot 72. Following this, the handle 14 is moved forwardly to move the fingers 48 and 50 therewith, so that the pin 70 moves plate 26 rearwardly and occupies the position shown as 1 in dotted outline in FIG. 10 against the trailing edge 106 of slot 72. To shift to second gear, the handle 14 is moved rearwardly so that the pin moves plate 26 forwardly and occupies the position shown as 2 in dotted outline in FIG. 10 against the leading edge 108 of slot 72. In so doing the pin will pass over the notch 74, but the inclination afforded by the surfaces 110 and 112 defining the bottom of slot 72 will cause the pin to remain in notch 82 and to continue to travel toward the leading edge 108 of the slot 72 rather than downwardly into the notch 74. To shift into third gear, the handle 14 is again moved forwardly. However, at this point, the pin, being captivated in the notch 82 which has the downwardly and rearwardly trailing edge 82b, is urged into the notch 74 as the pin passes thereover in its rearward movement, in that the lower edge 112 of the slot 72 permits the pin to move downwardly into notch 74 as the angled trailing edge 82b of the notch 82 tends to urge pin 70 downwardly. Thus, this continued forward movement of lever 14 causes pin 70, by reason of its occupation in notch 74, to move plate 28 rearwardly, thereby relatively moving the pin 70 to the position shown as 3 in FIG. 10 or against the trailing edge 116 of the slot 80. Finally, to place the shift control in the fourth gear mode, the handle 14 is again moved rearwardly which will cause the pin 70 to move plate 28 forwardly, thereby relatively moving pin 70 to the position shown as 4 in dotted outline in FIG. 10 against the leading edge 118 of the slot 80. All of this movement is accomplished by moving a lever 14 in a single plane or linear path of travel with none of the common "cross-over" required.

Reverse Control System

The reverse lock out and control system generally comprises the elements of the plates 20, 22, 24 and associated subcomponents. More specifically, lugs 128 and 130 project laterally outwardly from the bottom of offset portion 20d of plate 20 and define a space 132 therebetween. Movable reverse plate 22 has a stub 134 which extends through arcuate slot 138 in plate 24 and a depending tongue 136 at its lower end of a size and shape to extend through space 132.

The reverse plate 24 has a depending tongue 140 with an opening 142 therein for receiving a link 144 which may extend to the transmission for moving components thereof into a reverse gear move. The reverse plate 24 also includes a right angular extension 146 having an opening 148 therein. A reverse plate biasing means in the form of a spring 150 has a hooked end 150a which is connected to opening 148 and another hooked end 150 which is connected to a turnbuckle 152. The turnbuckle 152 has a threaded end 154 which extends through an opening 156 of leg 158 which is an extension of the base plate 12. A lock nut 160 on the underside of the leg 158 locks the turnbuckle 152 to leg 158. In addition, the plate 20 has a stub 162 and plate 24 has an opening 166 in which stub 162 is received, the stub 164 avoiding the plate 22 by extending in the area of the right angular recess 168 in plate 22.

In operation, when the shift control assembly is in a neutral mode as shown in FIG. 1, the reverse lever 16 may be moved forwardly and downwardly by virtue of the retention of the bolt 30 through the wide slot 38 in the plate 24 and the enlarged opening 40 in the plate 22. Thus, plate 22 may move with the shift lever 14, but in the neutral mode is free to move downwardly in that the connection of the plate 24 with the plate 22 permits the tongue 136 to be moved downwardly in space 132 between the lugs 128 and 130. This is accomplished by the forward movement of the reverse control lever 16 which causes stub 134 on the plate 22 to be cammed downwardly by a slot 138 in the reverse plate 24. This slot is arranged in such a fashion that when the locking lever is unable to move downwardly between the lugs 128 and 130 because the main shift control lever is not in a neutral position, the reverse lever 16 may not be moved and, consequently, the reverse shift plate 24 which is attached thereto cannot be moved as well. As an additional safety feature, when the reverse control lever 16 has been moved to the reverse position, to place the system in a reverse mode of operation, if the rod 18 is pulled upwardly, pressure on the follower 70 will cause the reverse gear plate 24 and control lever 16 to move back to the neutral position.

Three Speed Mode

In FIGS. 11 and 12 a modified embodiment 210 of a three speed shift control as shown. Embodiment 210 includes a base plate 212, a forward shift control lever 214, and a shift rod 218 with the knob 214a on the lever 214 and a T-shaped handle 218a on the lever 218.

The assembly 210 includes one gear plate 226 and another gear plate 228 on opposite sides of the lever 14. A bolt 230 extends through an opening 232 in plate 226, opening 234 in lever 214, opening 236 in plate 228 and opening 240 in frame plate 212. Suitable washers 242 are provided about the pin or bolt 230 as well as a spacer 244 between plates 228 and 212. A nut 246a is connected to the bolt 230 at the rear of plate 212 and another nut or head 246b is provided outside of the plate 226. By this arrangement the plates 226, 228 and lever 214 are rotatably mounted with respect to the plate 212.

The embodiment 210 further includes a pair of gate arms 248 and 250 which are pivoted at 251 to either side of the lower portion of lever 214. Each of these gates or fingers 248 and 250 are provided with openings 252 and 254 through which a follower pin 270 is received. Closure plates 256 and 258 on the outside of plates 226 and 228 in the areas of the slots 272 and 280 retain the pin 252 within the slots. Slots 272 and 280 are provided with notches 274 and 282 and it is intended that the shapes of the slots 270 and 280 and the relationships of these slots are the notches 274 and 272 with respect to the pin 270 would generally correspond to the description heretofore given with respect to the slots 72 and 80, notches 74 and 82 and pin 70.

In addition, the lever 214 is provided with extensions 252 having openings through which the rod 218 passes. The lower end of rod 218 is surrounded by a spring 258 and a washer 266 is held by means of nut 268 at the lower threaded end 256 of the rod 218 below the fingers 248 and 250 in a manner similar to that described with respect to the structure shown in FIGS. 1 through 10 relative to the embodiment 10. Thus, in a similar arrangement, the fingers 248 and 250 are normally biased downwardly and are movable upwardly by an upward pull on the rod 218.

The lower end of the plate 226 terminates in a tongue 292 having an opening 294 therein which may be connected to suitable transmission linkage. Similarly, the lower end of the plate 228 terminates in a tongue 298 having an opening 300 which also may be connected to suitable transmission linkage.

Generally speaking, the four positional movements of the shift control 10 shown in FIGS. 11 and 12 correspond to that with respect to the four forward speed positions described with respect to embodiment 10 in FIGS. 1 through 10. The difference is that one of the four positions of embodiment 210 may be associated with the reverse gear in the transmission with the other three positions being associated with forward gears. Thus, when the rod 218 is lifted, the control handle 214 is activated and may be moved to a first or reverse gear position, depending on the direction of planar movement of handle 214. Again, however, the movement of the shift lever 214 is linear or in a single plane, eliminating the need for "crossing over" as in common manual transmissions, particularly those which operate on the well known H pattern.

Thus, it can be seen that the shift control assemblies 10 and 210 of this invention are a novel and significant advance in the art in that they permit shifting to be accomplished in a single plane or linear path of movement, even for a four forward speed transmission. This is accomplished through the unique arrangement of a normally downwardly biased pin and its association with vertically offset slots and overlapping notches of two different gear plates. The specific configuration and orientation of these slots and notches is such that, in passing in one direction over a downwardly extending notch, the pin does not drop, but when passing in the other direction the pin is urged into the lower notch and, therefore, the lower slot. In addition, in the four speed version a separate reverse gear mechanism is prevented from operating in all but a neutral mode so that this separate lever could not be manipulated when the assembly is in a forward gear mode of operation, and, in the three speed version the shift lever can not be activated to move to reverse until the spring urged handle is lifted while in the neutral mode.

The foregoing detailed description has been given for clearness of understanding only, and no necessary limitations should be understood therefrom, as some modifications may be obvious to those skilled in the art.

We claim:

1. A shift control apparatus for use in controlling the gear mode selection for a transmission, comprising: means defining a base plate, an operating lever movably connected to said base plate for movement in a planar path of travel from neutral to operational positions, a plurality of gear selector plates movably mounted on said connection of said operating lever to said base plate, said gear plates being selectively connectible with said lever for movement of said gear plates responsive to said movement of said lever in a planar path of travel, said means for connecting said gear plates to said lever including a lost motion connection defined by vertically offset tracks in each of said plates, each of said tracks being defined by first and second ends, a follower operatively associated with said lever and which moves in said tracks, and opposed track extensions, each of said track extensions communicating with one track and extending toward the other track, and said plates including means for urging the follower from one track to the other track during movement of the follower between said first and second ends responsive to movement of said lever.

2. The apparatus of claim 1 further including a reverse gear selector plate movably connected to said base plate for movement in a second path of travel between a retracted, inoperative position, and an extended, operative position, a locking plate having first locking surfaces and being associated with said operating lever for movement therewith through one path of travel and said reverse gear selector plate for movement therewith in a second path of travel; and locking means associated with said base plate including second locking surfaces engageable with said first locking surfaces of said locking plate when said operating lever is in other than a neutral position preventing movement of said locking plate in said second path of travel, thereby preventing movement of said reverse gear selector plate when said operating lever is in other than a neutral position.

3. The apparatus of claim 1 wherein said operating lever and gear selector plates are mounted for pivotal movement about a common axis.

4. The apparatus of claim 1 wherein the urging means comprises a cam surface on at least one of said tracks.

5. The apparatus of claim 4 wherein the follower is connected to a downwardly biased movable finger for movement therewith and wherein said finger is connected to a lifting arm which is movable relative to said operating lever to provide said lifting means for raising the follower.

6. The shift control apparatus of claim 1 wherein the tracks are vertically offset and said follower is normally urged downwardly toward the lower track and the upper track extension and wherein the upper of the offset tracks includes a guiding surface between the first end and its own depending track extension for guiding the follower towards its depending extension and the lower track of the other plate.

7. The shift control apparatus of claim 6 wherein the lower track of the other plate has its extension upright which also includes a guiding surface for urging the follower toward the depending extension of the upper track and the lower track of said other plate.

8. The shift control apparatus of claim 7 wherein said guiding surface of the upper track includes an interrupted lower edge including first and second edge portions extending from said first and second ends thereof and terminating at said track extension which depends from said edge portions; and wherein said lower track has an interrupted upper edge including first and second edge portions extending from the first and second ends thereof with the track extension extending upwardly from the termination of the said edge portions of the lower track.

9. The shift control apparatus of claim 8 wherein the first portion of the upper track lower edge extends below the lower track upper edge.

10. The shift control apparatus of claim 9 wherein the guiding surface of the lower track includes a second edge which is inclined downwardly towards the second end of the lower track.

11. The shift control apparatus of claim 2 wherein the gear selector plates and said reverse gear selector plate have openings therein and are movably connected to said base plate about a common pivot axis and wherein said reverse gear selector plate has an opening for said follower which is enlarged relative to said gear selector plate openings for movement of said gear selector plates independent of said reverse selector plate.

12. The shift control apparatus of claim 11 wherein said locking plate has a vertically enlarged opening through which a master pivot bolt extends coincident with said axis for movement of said locking plate with said other gear selector plates and for vertical movement of said locking plate with said reverse gear plate independent of said other plates.

13. The shift control apparatus of claim 12 wherein the locking plate has a depending tongue which comprises said first locking surfaces and said second locking surfaces comprise lateral extensions spaced apart a distance substantially equal to the width of said depending tongue of said locking plate.

14. The shift control apparatus of claim 13 including means normally biasing said reverse gear plate against movement.

15. The shift control apparatus of claim 14 wherein said reverse gear plate is independently pivotally associated with said base plate for movement of said reverse gear plate independent of said other plates.

16. The shift control apparatus of claim 15 wherein said reverse gear plate is normally biased against movement relative to said base plate.

17. The shift control apparatus of claim 1 wherein said gear selector plates are provided on opposite sides of said operating lever.

18. The shift control apparatus of claim 17 wherein the means for urging the follower includes a pair of fingers positioned between said gear selector plates and in which said follower is captivated, and a finger-lifting arm movably connected to said operating lever and connected to said fingers for movement of said fingers in opposition to said urging means.

19. The shift control apparatus of claim 18 wherein said reverse gear plate is positioned between said operating lever and said base plate.

20. The shift control apparatus of claim 19 wherein said locking plate is positioned between said reverse gear plate and said base plate.

21. The shift control apparatus of claim 20 wherein said several gear plates are assembled about a master pivot bolt which extends through a gear plate, the operating lever, another gear plate, the reverse gear plate, the locking plate, and is fixed to the base plate; and wherein the reverse gear plate is provided with a vertically and laterally enlarged opening through which the pivot bolt extends and wherein the locking plate is provided with a vertically enlarged opening through which thepivot bolt extends.

22. The shift control apparatus of claim 21 wherein said finger-lifting arm being connected with said reverse gear plate for movement of said reverse gear plate responsive to said movement of said finger-lifting arm.

23. A shift control apparatus for use in controlling the gear mode selection for a transmission, comprising: means defining a base plate, an operating lever movably connected to said base plate for movement in a planar path of travel from neutral to operational positions, a plurality of gear selector plates movably connected to said base plate, means operatively connecting said gear plates with said lever for movement of said gear plates responsive to said movement of said lever in a planar path of travel; a reverse gear selector plate movably connected to said base plate for movement in a second path of travel between a retracted inoperative position, and an extended operative position; a locking plate having first locking surfaces and being associated with said operating lever for movement therewith through one path of travel and said gear plate for movement therewith in second path of travel; and locking means associated with said base plate including second locking surfaces engageable with said first locking surfaces of said locking plate when said operating lever is in other than a neutral position preventing movement of said locking plate in said second path of travel, thereby preventing movement of said reverse gear selector plate when said operating lever is in other than a neutral position.

24. The shift control apparatus of claim 23 wherein the gear selector plates are movably connected to said base plates about a master pivot bolt and wherein said reverse gear plate has a laterally and vertically enlarged opening therethrough through which said pivot bolt extends for movement of said other plates independent of said reverse gear plate.

25. The shift control apparatus of claim 24 wherein said locking plate has a vertically enlarged opening through which said master pivot bolt extends for movement of said locking plate with said other gear selector plates and for vertical movement of said locking plate with said reverse gear plate independent of said other plates.

26. The shift control apparatus of claim 25 wherein the locking plate has a depending tongue which comprises said first locking surfaces and said second locking surfaces comprise lateral extensions spaced apart a distance substantially equal to the width of said depending tongue of said locking plate.

27. The shift control apparatus of claim 26 wherein said reverse gear plate is independently pivotally associated with said base plate for movement of said reverse gear plate independent of said other plates.

28. The shift control apparatus of claim 27 wherein said reverse gear plate is normally biased against movement relative to said base plate.

* * * * *